July 2, 1957  B. A. MAIN, JR  2,797,474
METHOD OF APPLYING HOSE FITTINGS
Original Filed Sept. 14, 1950

INVENTOR
BENJAMIN A. MAIN, JR.

BY *Tournsen P.F. Beaman*

ATTORNEY

United States Patent Office 2,797,474
Patented July 2, 1957

2,797,474
METHOD OF APPLYING HOSE FITTINGS

Benjamin A. Main, Jr., Rives Junction, Mich., assignor to Aeroquip Corporation, Jackson, Mich., a corporation of Michigan Original application September 14, 1950, Serial No. 184,813, now Patent No. 2,731,279, dated January 17, 1956. Divided and this application October 30, 1953, Serial No. 389,223

1 Claim. (Cl. 29—506)

This invention relates to an improved method of applying socket and nipple end fittings to the end portions of flexible hose and in particular to gripping and sealing off leakage at the end of a section of flexible hose employed to conduct fluids and secured between inner and outer surfaces of a socket and nipple assembly.

This application is a division of Patent No. 2,731,279, filed September 14, 1950.

It is an important object of the present invention to provide an improved method of securing a socket and nipple end fitting upon the end portion of a section of flexible hose, more particularly hose having an inner tube of rubber, or rubber-like material, and a reinforcing cover of wire braid.

It is thus an object of the invention to provide a method by which a cylindrical flap can be severed from one end of a section of flexible hose upon assembly of a nipple within its companion socket already applied over the hose and in which said flap becomes non-compressively sealed upon the nipple as the remainder of the hose end portion is gripped by compression between inner and outer surfaces of the socket and nipple, respectively.

The above and further objects and advantages of the invention will appear clear from consideration of the following detail description of one mode of carrying out the invention with respect to a particular and practical embodiment of the invention, by way of example, with reference to the accompanying drawings and from the appended claim.

Figure 1:
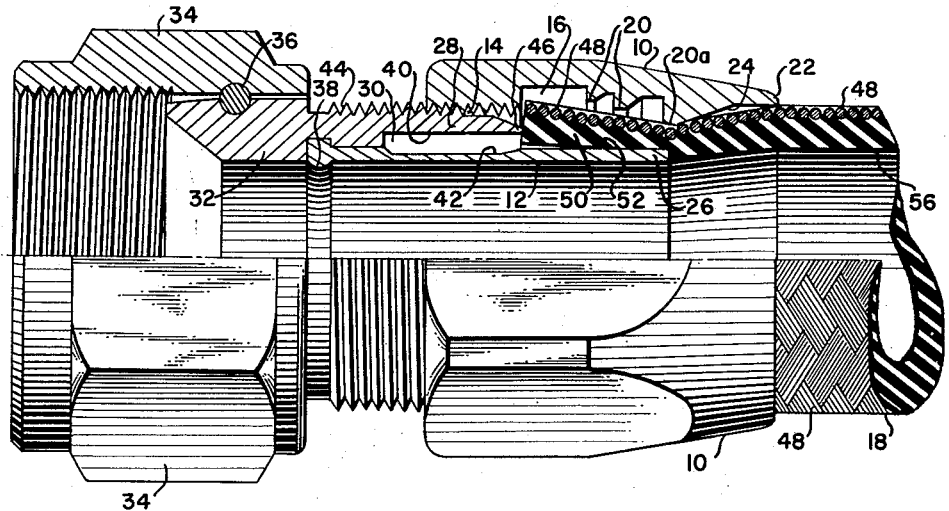
Figure 2:
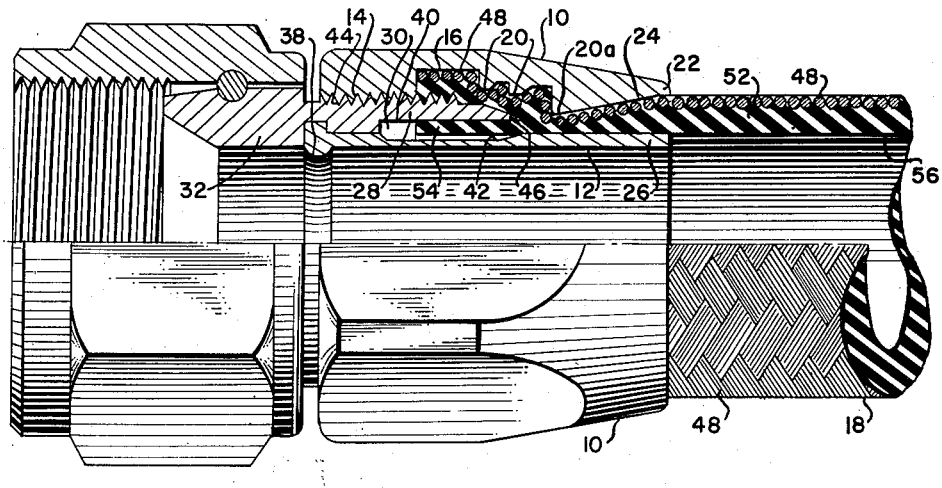

In the accompanying drawings,

Figure 1 is a half sectional, half elevational view of an end fitting in accordance with the invention, showing the position of the parts upon assembly of the end fitting upon a hose end portion and showing the outer nipple portion about to cut into the hose, and Figure 2 is a similar view to Figure 1 but showing the end fitting completely assembled upon the hose.

Referring to the drawings, the end fitting is shown as comprising an outer tubular socket, indicated generally at 10, and an inner tubular nipple, indicated generally at 12.

The socket is formed at one end with a screw-threaded opening 14. Adjacent said end, and on the socket interior, there is an enlarged annular recess 16 of an external diameter in excess of the external diameter of a length of flexible hose, indicated generally at 18, to an end portion of which hose it is desired to affix the end fitting. This recess, on the socket interior, is followed by an axially spaced series of inwardly projecting annular protrusions 20, 20a which define openings of progressively decreasing diameter in a direction away from the socket opening 14 and towards the opposite end of the socket, where the socket interior has a short cylindrical portion 22 followed by an inwardly directed bevelled annular surface 24 merging into the protrusion 20a, which defines the smallest of said openings. The diameter of the interior cylindrical end portion 22 of the socket approximates that of the external diameter of the hose 18. With regard to the diameter of the opening defined by the protrusion 20a, this will be smaller than the external diameter of the hose but must not be so small as to prevent the leading end of the inner nipple portion 26 from being advanced axially along the inside of the bore of the hose and past the protrusion 20a as the nipple is screwed into the socket. The actual diameter may vary within limits and is capable of ready determination by those skilled in the art, who will be aware of the degree of deformation of the hose at the protrusion 20a, as seen in Figure 1, and the possibility of the leading end of the nipple portion 26 being able to pass along the hose bore without digging-in to the hose material or exerting pressure against the hose which might cause the hose to be pushed out of the socket. In some instances, as with small size hose with an internal diameter of ¼ inch or less it might be necessary to taper the inner nipple portion on its outer surface adjacent and towards its said leading end in order to avoid such digging-in or pushing action from occurring.

The nipple 12 comprises an inner tubular part 26 and an outer tubular part 28 which is concentric with the inner part 26 and defines therewith an annular chamber 30. The outer nipple part 28 is shown with an integral end portion 32 having an annular recess which, with a corresponding recess on a hollow nut 34, forms an enclosure for a wire ring 36 by which the nut has a swivel connection with the nipple. The inner nipple part 26 is shown separately formed and connected to the nipple part 28 at 38. On its exterior surface, and opposite the interior cylindrical surface 40 of the outer nipple part, the inner nipple part 26 is formed with a relief 42. The outer tubular nipple part 28 has exterior screw-threading 44 and a pointed end 46, which provides a cutting edge. Said nipple part 28 is made so as to be substantially non-deformable by the compressive forces of assembly of the end fitting upon the hose, whereby the chamber 30 has a substantially fixed volume.

To assemble the end fitting upon the end portion of the hose 18, as seen in Figure 2, the socket is first applied over the hose exterior, which is shown constituted by wire braid 48. As the socket is applied over the hose it will be deformed by compression at the protrusion 20a, with an attendant flaring-out of the hose end, as indicated at 50 in Figure 1. With the socket applied over the hose and positioned as seen in Figure 1, the nipple is then screwed into the socket by engagement of the screw-threading 14 and 44. As the nipple is screwed into the socket its pointed end 46 will be brought into cutting contact with the end edge of the inner layer 52 of the hose, which layer is shown as being of rubber. With the parts positioned as shown in Figure 1, the socket will be securely held upon the hose end due to the compression between 20a and the inner nipple part 26, to the extent that continued screwing of the nipple into the socket will cause the pointed nipple end 46 to cut into the hose layer 52 and form a cylindrical flap 54 (Figure 2) which enters into the chamber 30 as the cutting operation proceeds and the nipple enters further into the socket. At the same time the inner nipple portion 26 will advance along the hose bore 56, passing by the maximum compression zone defined by the protrusion 20a and coming to rest approximately opposite the cylindrical end 22 of the socket. The compression of the hose between the protrusion 20a and the inner nipple part 26, and the cutting of the cylindrical flap 54, will be attendant with a forcing of the outer socket hose layer into the socket recess 16 and into engagement with the protrusions 20, against which the hose reinforcement is forced by compression between these protrusions and the exterior surface of the outer nipple part 28. The relief 42 serves to reduce surface friction upon the flap 54 as it is constrained to enter the chamber 30. This is advantageous as it prevents undue damage to the material of the flap.

With the end fitting fully assembled upon the hose end, as shown in Figure 2, the ridge 20a, together with the inner nipple part 26, imposes pressure upon the hose in advance of the pointed end 46 of the outer nipple part to the extent that fluid within the hose which is of sufficient pressure to force it way past the protrusion 20a and travel between the hose bore 56 and the outer surface of the inner nippel portion 26 will also be sufficient to force the flap 54 into firm fluid-sealing contact with the surface 40 of the chamber 30 and thus arrest further outward flow of the fluid.

Having thus disclosed my invention what I claim as novel and wish to secure by Letters Patent is:

A method of gripping and sealing off leakage at the end of flexible hose employed for conducting fluids in which an end portion of the hose is secured between an outer tubular socket and an inner tubular nipple, comprising the steps of inserting the hose end portion within the socket by relative axial displacement between the hose and the socket, then inserting the nipple through one end of the socket so that the nipple enters slidably into the hose bore with a snug fit, holding the hose within the socket by pressure applied to the hose between opposed portions of the socket and the nipple located in axially spaced relation from a cutting edge provided upon the nipple for cutting into the hose from the end thereof which is inserted in the socket and, while the hose is firmly held between the socket and the nipple, rotating the nipple so that the said cutting edge cuts into the hose and forms an inner cylindrical flap thereon which enters into sealing engagement within an annular space defined between inner and outer portions of the nipple and the remainder of the hose end portion is finally gripped between the socket and the nipple.

References Cited in the file of this patent
UNITED STATES PATENTS

| | | |
|---|---|---|
| 1,915,041 | Wallace | June 20, 1933 |
| 1,977,219 | Williams | Oct. 16, 1934 |
| 2,431,522 | Trevaskis | Nov. 25, 1947 |